(12) United States Patent
Trika (10) Patent No.: US 6,362,833 B2
(45) Date of Patent: *Mar. 26, 2002

(54) METHOD AND APPARATUS FOR PROGRESSIVELY CONSTRUCTING A SERIES OF MORPHS BETWEEN TWO-DIMENSIONAL OR THREE-DIMENSIONAL MODELS

(75) Inventor: Sanjeev N. Trika, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,787

(22) Filed: Apr. 8, 1998

(51) Int. Cl.$^7$ .............................................. G06T 17/20
(52) U.S. Cl. ..................... 345/646; 345/619; 345/629; 345/419; 345/418; 345/672
(58) Field of Search ................................ 345/619, 629, 345/630, 634, 646, 692

(56) References Cited

U.S. PATENT DOCUMENTS

| | | | | |
|---|---|---|---|---|
| 5,448,686 A | * | 9/1995 | Borrel et al. ................ | 395/120 |
| 5,590,261 A | * | 12/1996 | Sclaroff et al. .............. | 395/173 |
| 5,886,702 A | * | 3/1999 | Migdal ........................ | 345/423 |
| 5,945,996 A | | 8/1999 | Migdal et al. | |
| 5,963,209 A | * | 10/1999 | Hoppe ........................ | 345/419 |
| 5,966,140 A | * | 10/1999 | Popovic et al. .............. | 345/441 |
| 5,969,722 A | * | 10/1999 | Palm .......................... | 345/420 |
| 5,990,901 A | * | 11/1999 | Dawton et al. .............. | 345/429 |
| 6,009,435 A | * | 12/1999 | Taubin et al. ................ | 707/101 |
| 6,031,548 A | * | 2/2000 | Gueziec et al. ............. | 345/440 |
| 6,057,849 A | * | 5/2000 | Haubner et al. ............. | 345/428 |
| 6,094,199 A | * | 7/2000 | Turkiyyah et al. ........... | 345/419 |
| 6,147,692 A | * | 11/2000 | Shaw et al. .................. | 345/433 |
| 6,285,372 B1 | * | 9/2001 | Cowsar et al. .............. | 345/425 |
| 6,285,794 B1 | * | 9/2001 | Georgiev et al. ........... | 382/243 |

OTHER PUBLICATIONS

Arthur Gregory, et al., "Feature–based Surface Decomposition for Correspondence and Morphing between Polyhedra", Department of Computer Science, University of North Carolina at Chapel Hill, pp. 1–4.

John F. Hughes, "Scheduled Fourier Volume Morphing", Computer Graphics, 26.2, Jul. 1992, 1992. pp. 43–46.

Apostolos Lerios, et al., "Feature–Based Volume Metamorphosis", Computer Science Department; Standford University, pp. 1–7.

(List continued on next page.)

Primary Examiner—Matthew Luu
Assistant Examiner—Daniel J Chung
(74) Attorney, Agent, or Firm—Steven P. Skabrat (57) ABSTRACT

Morphing between two-dimensional or three-dimensional computer graphic models is accomplished by reducing given models from full resolution to low resolution ones between which the morph can be constructed either trivially or with simple user interaction, and then refining the morph using local searches as the two models are progressively refined back to full resolution.

34 Claims, 6 Drawing Sheets

OTHER PUBLICATIONS

Kartik Venkataraman, et al., "Piece-wise Linear Morphing and Rendering with 3D Textures", Microprocessor Reasearch Labs, Intel Corporation; Santa Clara, USA. pp. 1–10.

Charles S. Stein and Lewis E. Hitchner, "The Multiresolution Dissolve", SMPTE Journal, Dec. 1998, pp. 977–982 and p. 984.

Hugues Hoppe, "Progressive Meshes", Microsoft Research, 8 pgs.

Hugues Hoppe, "View–dependent Refinement of Progressive Meshes", Microsoft Research, 10 pgs.

James R. Kent, Wayne E. Carlson and Richard E. Parent, "Shape Transformation for Polyhedral Objects", Dept of Computer and Information Science Advanced Computing Center for the Arts and Design, The Ohio State University, pp. 47–53.

Anil Kaul and Jarek Rossignac, "Solid–Interpolating Deformations: Construction and animation of PIPs", Proceedings of Eurographics '91 in *Computers and Graphics* (1991), pp. 443–505.

Costa, et al., "Warping and Morphing of Graphical Objects", Siggraph '97 24th International Conference on Computer Graphics and Interactive Techniques, Aug. 3–8, 1997, pp. 35–59 and pp. 135–149.

Cohen–Or, Daniel, et al., "Three–Dimensional Distance Field Metamorphosis," ACM Transactions of Graphics, vol. 17, No. 2, Apr. 1998, pp. 116–141.

Goldstein, Eli, et al., "Polygon Morphing Using a Multi-resolution Representation," Proceedings of Graphics Interface '95, pp. 247–254 (1995).

Sun, Yue Man,, et al., "Interpolating Polyhedral Models Using Intrinsic Shape Parameters," Proceedings of the Third Pacific Conference on Computer Graphics and Applications, Pacific Graphics '95, pp.133–147. (1995).

* cited by examiner

METHOD AND APPARATUS FOR PROGRESSIVELY CONSTRUCTING A SERIES OF MORPHS BETWEEN TWO-DIMENSIONAL OR THREE-DIMENSIONAL MODELS

A portion of the disclosure of this patent document contains material which is subject to copyright protection. The copyright owner has no objection to the facsimile reproduction by anyone of the patent document or the patent disclosure, a s it appears in the Patent and Trademark Office patent file or records, but otherwise reserves all copyright rights whatsoever.

BACKGROUND

1. Field

The present invention relates generally to computer graphics and, more specifically, to shape transformation of two-dimensional and three-dimensional objects on a computer display.

2. Description of Related Art

In recent years, image processing techniques, popularly known as "morphing," have achieved widespread use in the entertainment industry. Morphing involves the transformation of one image into another image or from one model into another model. Morphing operations can be performed to transform one two-dimensional (2-D) image into another 2-D image, to transform one 2-D model into another 2-D model, or to transform one three-dimensional (3-D) model into another 3-D model. These techniques specify some operation that maps points from one image or model onto points of the other image or model, and then simultaneously interpolate the color and position of corresponding points to generate intermediate images or models. When viewed in sequence, these intermediate images produce an animation of the first image or model changing into the second image or model. Variations of these techniques have been used to create special effects for television commercials, music videos, movies, and web pages on the World Wide Web.

Morphs are typically restricted to 2-D images, primarily because a realistic transition between two-dimensional (2-D) and three-dimensional (3-D) models is difficult to specify. However, such specifications might be valuable because the resulting morph can be viewed from arbitrary viewpoints in arbitrary settings, can be arbitrarily scaled and placed, and provides greater compression and realism.

There are at least two existing approaches for defining a morph between two 3-D models, each of which may be adapted for 2-D models. The first approach is described in "Shape Transformation For Polyhedral Objects", by James R. Kent, et al., Computer Graphics, Vol. 26, No. 2, July, 1992. Kent, et al. describes a process that, given two 3-D polyhedral models, generates two new models that have the same or similar shape as the original ones, but that allow transformations from one to another to be easily computed. This process assumes the morphing of star-shaped objects only. If the objects are not star-shaped, then externally supplied information is employed to divide the non-star-shaped objects into several star-shaped objects for morphing. Star-shaped refers to models for which at least one interior point p exists such that any semi-infinite ray originating at p intersects the surface of the object at exactly one point. The second approach is discussed in "Solid-Interpolating Deformations: Construction and Animation of PIPs", by Anil Kaul and Jarek Rossignac, Eurographics '91, Proceedings of the European Computer Graphics Conference, September 1991, pp. 493–505. Kaul and Rossignac describe a process using an animation primitive called a Parameterized Interpolating Polyhedron (PIP), which may be animated on widely used graphic hardware because a PIP is a smoothly varying family of polyhedra representations bounded by faces that evolve with time. The faces have constant orientation and vertices that each move on a straight line between the vertex of the initial shape and a vertex of the final one. This process uses Minkowski sum operations for computing the PIPs.

There are several drawbacks to the above approaches. Both approaches exhibit a quadratic computational complexity, so they are impractical for some models. Furthermore, if two models to be morphed have $N_1$ and $N_2$ vertices, respectively, both approaches use $O(N_1*N_2)$ storage units for storing the intermediate representations. Hence, as the models grow more complex, the storage used becomes very large. With the existing approaches, content developers cannot easily adjust or guide the construction of the morph at low resolutions. Further, content developers do not have control over the morphing process through exposable parameters or alternative sub-algorithms.

Thus, an improved method of morphing 2-D and 3-D models is desired that reduces the deficiencies and limitations of the prior art.

SUMMARY

An embodiment of the present invention is a method of constructing morphs between a first model having a first resolution and a second model having a second resolution. The method includes determining a first morph between the first model and the second model, increasing resolution of at least one of the first and second models, and determining a subsequent morph between the first model and the second model.

BRIEF DESCRIPTION OF THE DRAWINGS

The features and advantages of the present invention will become apparent from the following detailed description of the present invention in which:

FIGS. 2a is an example illustration of a 2-D model at a higher resolution than that shown in FIG. 1a;

FIG. 2b is an example illustration showing the 2-D model of FIG. 1b with a fake vertex added for morphing to the model of FIG. 2a;

DETAILED DESCRIPTION

In the following description, various aspects of the present invention will be described. However, it will be apparent to those skilled in the art that the present invention may be practiced with only some or all aspects of the present invention. For purposes of explanation, specific numbers, examples and configurations are set forth in order to provide a thorough understanding of the present invention. However, it will also be apparent to one skilled in the art that the present invention may be practiced without the specific details. In other instances, well-known features are omitted or simplified in order not to obscure the present invention.

An embodiment of the present invention specifies a procedure for defining and refining a morph between two three-dimensional (3-D) models. The advantage of this embodiment is that it builds the morph progressively, e.g., the morph is built at a low model resolution and refined iteratively as the resolution of the models is increased. Resolution in this regard is measured in terms of numbers of vertices of the models, with models having more vertices being of a higher resolution and models having less vertices being of a lower resolution. This provides several advantages over the existing approaches. Embodiments of the present invention employ less computation than existing morph generating methods. Given two models as progressive meshes, the computation used is linear in the number of vertices, as opposed to quadratic for existing approaches. The morphs constructed by embodiments of the present invention are more compact to represent than those constructed by existing approaches. If the two models have $N_1$ and $N_2$ vertices, respectively, the morph constructed by the present invention uses $O(N_1+N_2)$ storage space, as opposed to $O(N_1*N_2)$ storage space for other approaches. Content developers using embodiments of the present invention may fine-tune and guide construction of the morph at desired resolutions (typically low). This is not possible with existing approaches. The morph may also be generated while the input models are being loaded from a storage or communications medium (such as a disk, the Internet, an intranet, and the like). Content developers may obtain even more control over the morphing process with embodiments of the present invention by choosing several exposable parameters and processes. For example, a choice of different progressive mesh generators can result in different morphs between the same two high resolution models. Finally, the present invention can handle non-star-shaped model geometries.

Embodiments of the present invention are premised on two observations. First, whereas it is difficult to determine a morph between two models represented at a high resolution, the morph is relatively easy to construct at a lower resolution of the two models. Second, if either of the two models is refined by adding more detail, the morph may be refined at the same time by a local search for the correct mapping of vertices between the models.

Figure 1A:
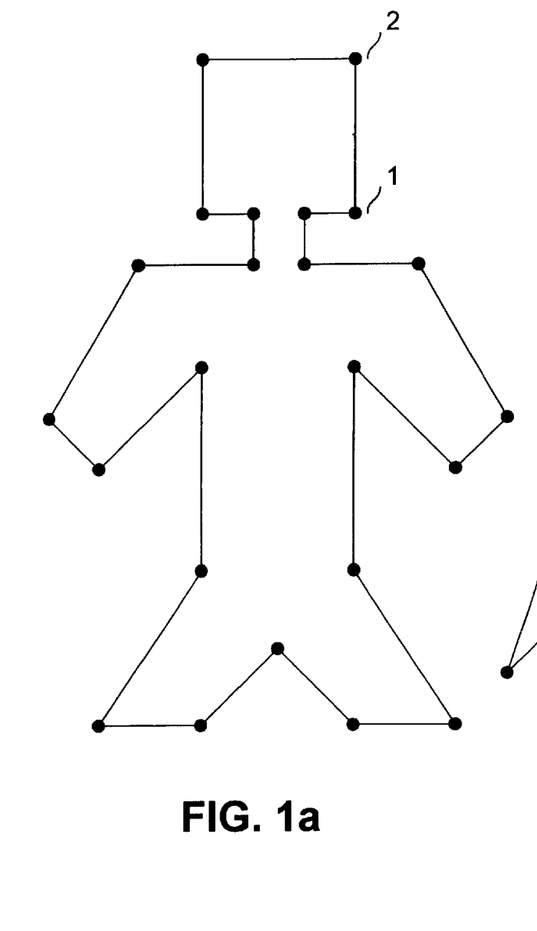
FIGS. 1a and 1b are example illustrations of low-resolution two-dimensional 2-D models.
Figure 1B:
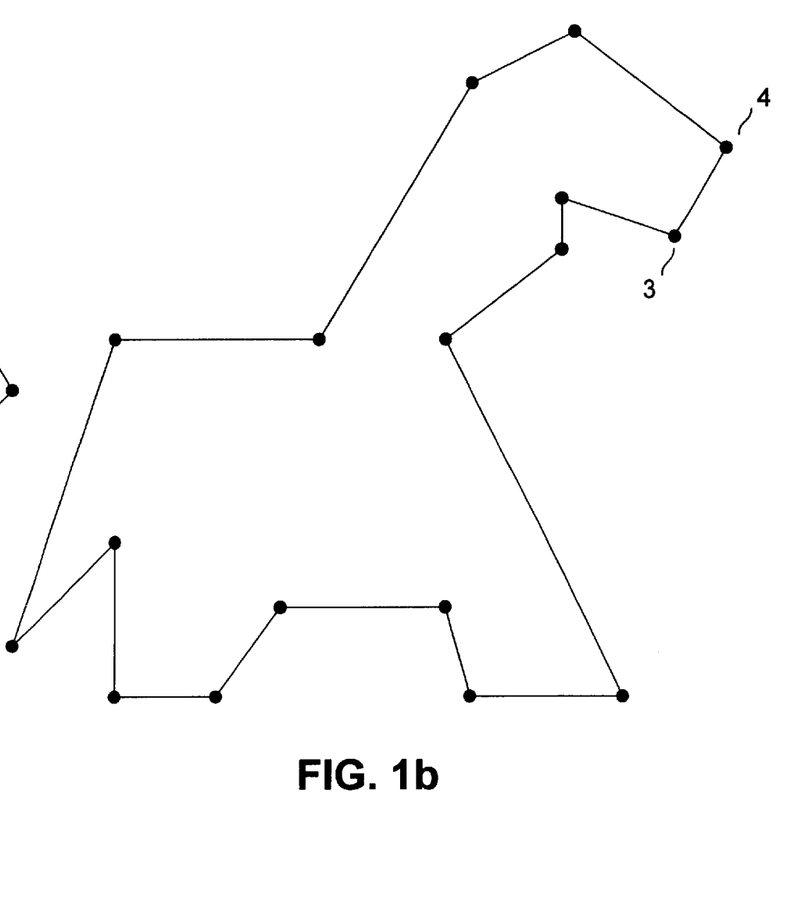
Figure 2A:
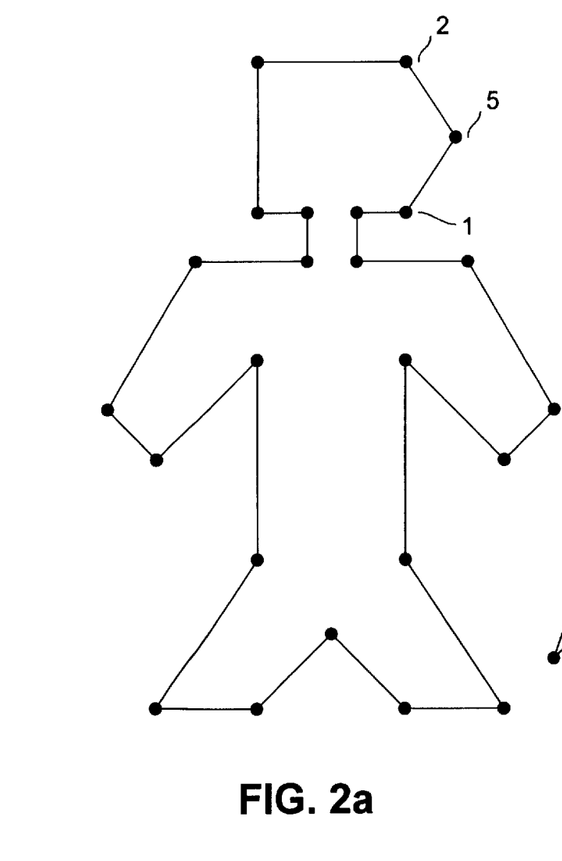
Figure 2B:
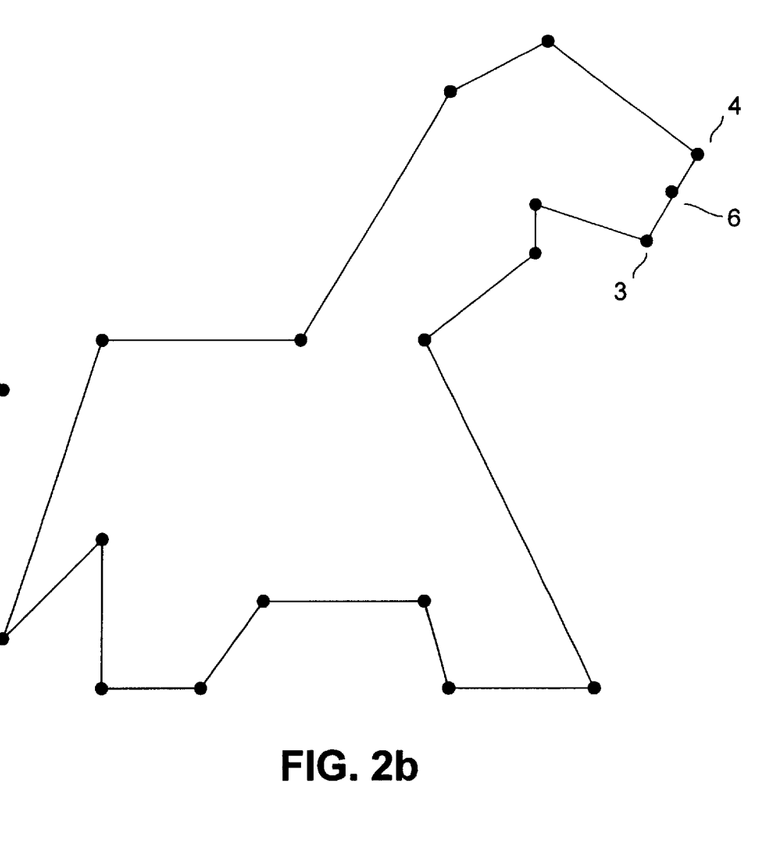

These concepts may be illustrated with a 2-D example, although the concepts are also valid for 3-D models. Consider a morph between the simplified human image shown in FIG. 1a and the simplified dragon image in FIG. 1b. The models shown in FIGS. 1a and 1b have a low resolution and may be represented in a small amount of storage. Assume that the vertices 1 and 2 of FIG. 1a match vertices 3 and 4 of FIG. 1b, respectively, in a predetermined morph. Now, assume that the human model of FIG. 1a is refined by adding a new vertex 5, deleting the edge between vertices 1 and 2, and connecting the new vertex as shown in FIG. 2a by adding edges between vertices 1 and 5 and between 5 and 2. The morphing system now determines a mapping for the added vertex 5 between the two models. This is done in embodiments of the present invention by examining the neighboring vertices and edges of the new vertex. Since the morph preserves the overall topology between the two objects (e.g., the human object and the dragon object), a new fake vertex 6 is inserted in the dragon model of FIG. 2b, between the dragon's vertices 3 and 4, and the connectivity of the vertices is updated as shown in FIG. 2b by adding edges between vertices 3 and 6 and between 6 and 4 and deleting the edge between vertices 3 and 4. Note that these operations include computation in the neighborhood of vertex 6 and the mapping between other parts of the models (such as the legs, hands, etc.) is not re-evaluated.

Embodiments of the present invention reduce given models from high resolution to low resolution ones between which the morph may be constructed either without user control or with simple user interaction, and then refine the morph using local searches as the two models are progressively refined back to full resolution.

Figure 3:
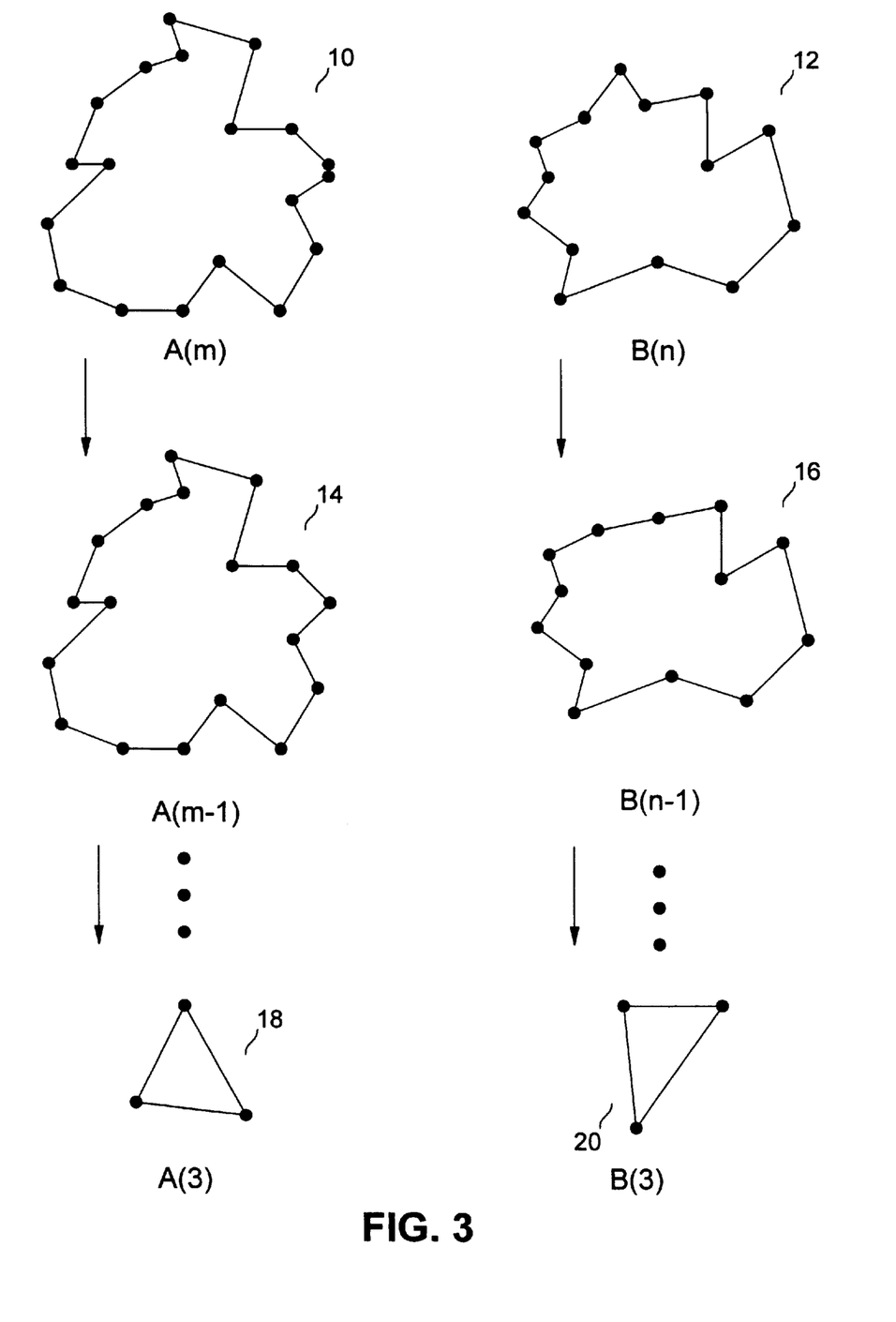
FIG. 3 is a diagram of two example polygons reduced for generation of progressively constructed morphs according to an embodiment of the present invention.

FIG. 3 is a diagram of two example polygons reduced for generation of progressively constructed morphs according to an embodiment of the present invention. This example shows progressive polygons in 2-D for simplicity, although the example could be expanded to progressive meshes in 3-D. Initially, polygon A(m) 10 has m vertices and polygon B(n) 12 has n vertices. Hence, polygon A(m) may be represented as a set of vertices $V_m=\{X_{m1}, Y_{m1}, X_{m2}, Y_{m2}, \ldots X_{mm}, Y_{mm}\}$, and polygon B(n) can be represented as a set of vertices $V_n=\{X_{n1}, Y_{n1}, X_{n2}, Y_{n2}, \ldots X_{nn}, Y_{nn}\}$. To construct morphs between A(m) and B(n), an embodiment of the present invention reduces A(m) and B(n) to a low resolution. The reduction for 2-D models is done by repeatedly finding the smallest edge in a polygon and removing it. For example, in FIG. 3, a vertex is removed from A(m) 10 to form A(m−1) 14, and a vertex is removed from B(n) 12 to form B(n−1) 16. In two dimensions, the lowest resolution model of a polygon is a triangle (having only three vertices). In three dimensions, the lowest resolution model is a tetrahedron (having four vertices). In the example of FIG. 3, A(3) 18 and B(3) 20 are the lowest resolution polygons. In an embodiment of the present invention, the reduction is performed for 3-D models according to the progressive mesh representation and associated algorithms described in "Progressive Meshes", by Hughes Hoppe, Computer Graphics SIGGRAPH'96 Proceedings, pp. 99–108, 1996, and "View-Dependent Refinement of Progressive Meshes", by Hughes Hoppe, 1997, although, of course, the invention is not limited in scope in this respect.

Figure 4:
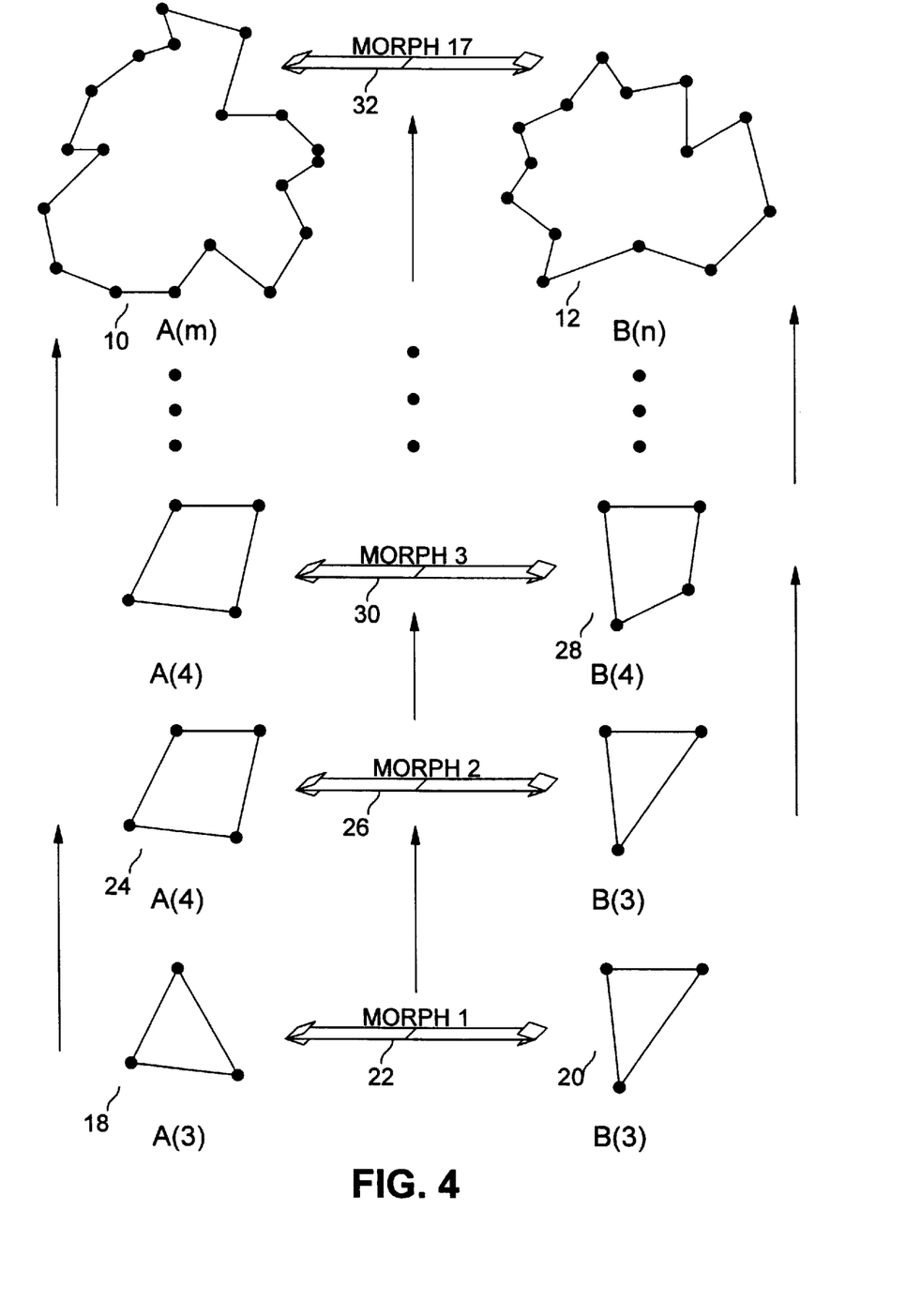
FIG. 4 is a diagram of a process of progressively constructing morphs according to an embodiment of the present invention.

When both polygons are represented at the lowest resolution (e.g., A(3) and B(3)), a morph (morph1 22) is determined between the reduced polygons. FIG. 4 is a diagram of a process of progressively constructing morphs according to an embodiment of the present invention. The resolution of one of the polygons (either A or B) is increased by one vertex to form A(4) or B(4). In the example of FIG. 4, a vertex is first added to the A polygon to form A(4) 24. A new morph (morph2 26) is then computed for the transformation A(4)→B(3) or A(3)→B(4). In the example of FIG. 4, the morph is for A(4)→B(3). The resolution of the polygon not increased in the preceding step is then incremented. In the example of FIG. 4, a vertex is added to the B polygon to form B(4) 28. A new morph (morph3 30) is then computed for the transformation A(4)→B(4). This process is repeated until both polygons are back to their original, highest resolutions of A(m) 10 and B(n) 12 and a final morph is computed (morph17 32). All computed intermediate morphs may be saved, although the invention is not limited in this respect.

Figure 5:
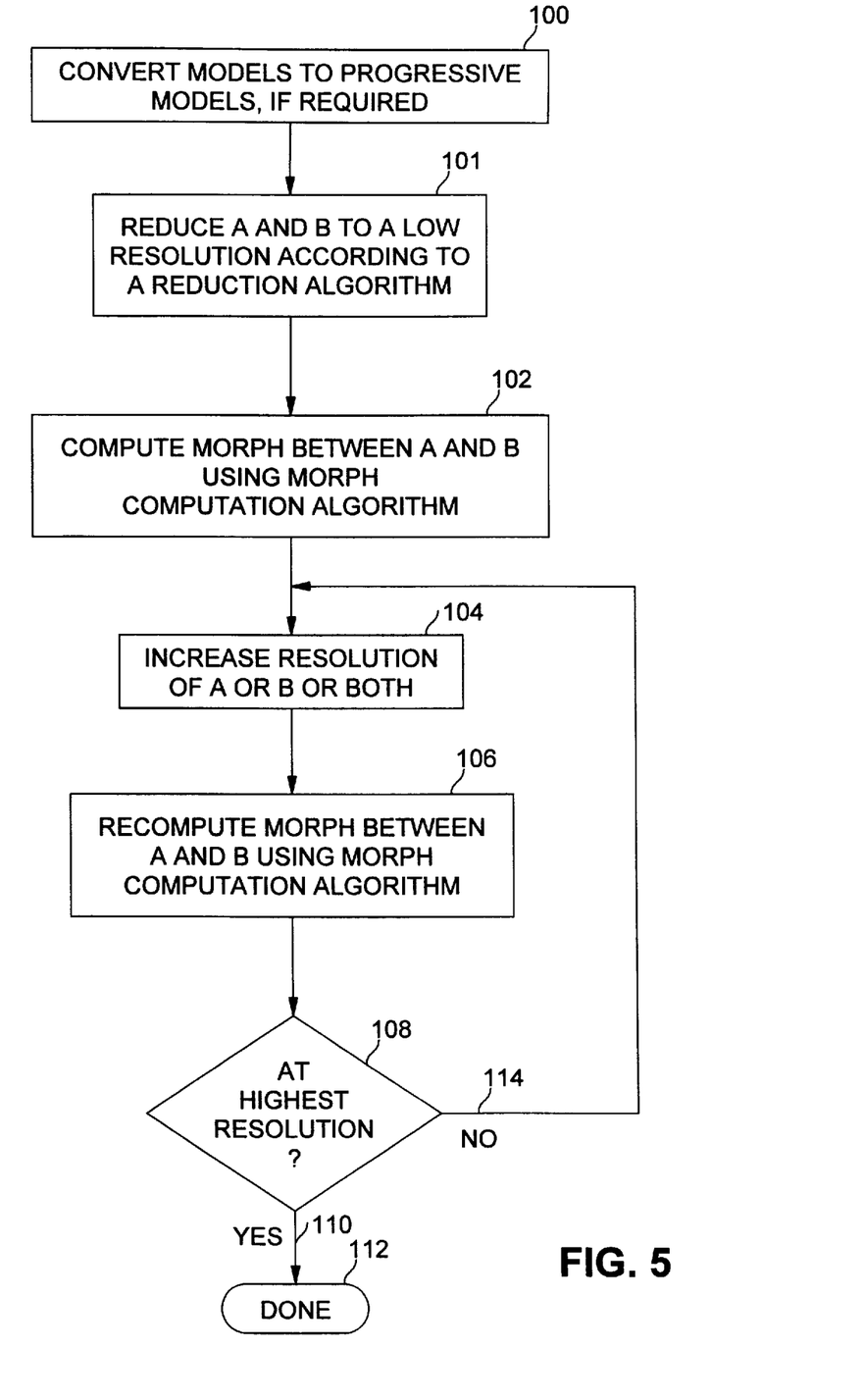
FIG. 5 is a flow diagram of a process for progressively constructing morphs according to an embodiment of the present invention.

FIG. 5 is a flow diagram of a process for progressively constructing morphs according to an embodiment of the present invention. At block 100, if the two models are not in a progressive format, then the models may be converted to a progressive format. Given two progressive models A and B, at block 101, the resolution of each model may be reduced. In one embodiment, for 2-D models, the models are reduced as described above, and for 3-D models, the models are reduced as taught by Hoppe, although the invention is not limited in scope in this respect. For example, other reduction algorithms may be employed. The level of reduction may be to three vertices (for 2-D models) or four vertices (for 3-D models), or to any intermediate number of vertices between three and the original number of vertices (for 2-D models) or four and the original number of vertices (for 3-D models). Next, at block 102, a morph is computed between low resolution versions of A and B. In one embodiment, the morph is computed according to the teachings disclosed in "Shape Transformation For Polyhedral Objects", by James R. Kent, et al., Computer Graphics, Vol. 26, No. 2, July, 1992. In other embodiments, alternate morph computation processes may be used. At block 104, the resolution of A or B or both A and B is increased. The resolution may be increased by only one vertex, or any number of vertices, such as selected by a user, for example. Next, at block 106 the morph between A and B is re-computed. If the models are at their highest resolutions at decision block 108, then path 110 is taken and processing is complete at block 112. Otherwise, further processing may be employed, and path 114 is taken back to block 104, where the resolution of the model A or B is increased.

In an embodiment of the present invention, generating a morph between two objects at the lowest resolution generally follows the process outlined by Kent, et. al for star-shaped objects. The process disclosed below is used for explanatory purposes. Other alternative processes and other variations of the Kent, et. al process may also be employed by those skilled in the art to generate a morph with an embodiment of a method in accordance with the present invention, although the invention is not limited in scope in this respect. The process disclosed by Kent, et. al, is applicable to 2-D models, because triangles are star-shaped. The Kent, et. al process is also applicable to 3-D models because tetrahedrons are star shaped. This particular embodiment of the present invention refines the Kent, et. al process for progressive morphing.

In the case of 2-D models, in one embodiment, a data structure representation of a morph between two polygons A and B consists of five elements. The first element comprises an array of real vertices of polygon A, denoted MORPH.realA. The second element comprises an array of real vertices of polygon B, denoted MORPH.realB. The third element comprises an array of fake vertices of polygon A, corresponding to real vertices of B, denoted MORPH.fakeA. The fourth element comprises an array of fake vertices of polygon B, corresponding to real vertices of A, denoted MORPH.fakeB. The fifth element comprises an array of tuples, the first element of which specifies which array to index into (realA or fakeA), and the second element of which comprises an index into the specified array. This element is denoted MORPH.vert_arr. The i'th element of the realA array corresponds to i'th element of the fakeB array. The i'th element of the fakeA array corresponds to the i'th element of the realB array. It will, of course, be appreciated that the invention is not limited in scope to employing this particular data structure.

These five elements may be used in the pseudo-code as shown below in Table I to morph between two triangles, although the invention is not limited in scope in this respect. The process is based on the technique presented by Kent et al.

Table I

© 1998 Intel Corporation
Process InitMorph2D (Triangle A, Triangle B)
Let cA=center of A
Let cB=center of B
Let MORPH=empty morph
/* Initialize MORPH.realA and MORPH.fakeB */
For I=1 to 3 do
   Let MORPH.realA [I]=A.v[I]
   Let r=ray from cA towards A.v[I] and beyond
   Translate r to start at cB, instead of cA
   Let MORPH.fakeB [I]=Intersection of r and B
End for
/* Initialize MORPH.realB and MORPH.fakeA */
For I=1 to 3 do
   Let MORPH.realB [I]=B.v[I]
   Let r=ray from cB towards B.v[I] and beyond
   Translate r to start at cA, instead of cB
   Let MORPH.fakeA [I]=Intersection of r and A
End for
/* Initialize MORPH.vert_arr and MORPH.connectivity */
For I=1 to 3 do
   Store (real, I) in MORPH.vert_arr
   Store (fake, I) in MORPH.vert_arr
End for
Reorder elements in MORPH.vert_arr so that they are in order
(i.e., MORPH.vert_arr[i] and MORPH.vert_arr[i+1] are directly connected)
Return (MORPH)

In the case of 3-D models, a representation of a morph between two meshes A and B consists of six elements. The first element comprises an array of real vertices of mesh A, denoted MORPH.realA. The second element comprises an array of real vertices of mesh B, denoted MORPH.realB. The third element comprises an array of fake vertices of mesh A, denoted MORPH.fakeA. The fourth element comprises an array of fake vertices of mesh B, denoted MORPH.fakeB. The fourth element comprises an array of tuples, the first element of which specifies which array to index into (realA or fakeA), and the second element of which comprises an index into the specified array. This element is denoted MORPH.vert_arr. The i'th element of the realA array corresponds to i'th element of the fakeB array. The i'th element of the fakeA array corresponds to the i'th element of the realB array. The sixth element is an array of indexed triangles. An indexed triangle comprises a list of three integers that are indices into the MORPH.vert_arr array. This element is denoted MORPH.connectivity.

Instead of using Kent, et. al's scheme for morphing between tetrahedrons, one embodiment of the present invention may be the following scheme. However, the process disclosed by Kent, et. al, could also be used, with modifications to the MORPH data structure described above, for example. One skilled in the art will recognize that other processes may also be used to generate a morph for a 3-D models consistent with other aspects of the present invention. The scheme disclosed below (corresponding to block 106) uses a straightforward mechanism to morph between the given tetrahedrons A and B. It tries all combinations of associating vertices of A with vertices of B, and picks the "best" combination, as measured by a Quality() function of the morph.

TABLE II

© 1998 Intel Corporation
Process InitMorph3D (Tetrahedron A, Tetrahedron B)
Let BestMorph = empty morph
Let CurMorph = empty morph
Let BestMorphQuality = -Infinity
For I = 1 to 4 do
    Let CurMorph.realA [I] = A.v[I]
    Let CurMorph.realB [I] = B.v[I]
    Let CurMorph.vert_arr [I] = (real, I)
    Let CurMorph.vert_arr [I + 4] = (fake, I)
    Let CurMorph.connectivity [I] = A.triangle [I]
End for
For I = 1 to 4 do
    Let (a, b, c) = B.triangle [I]
    Let ia = index of (fake, a) in MORPH.vert_arr
    Let ib = index of (fake, b) in MORPH.vert_arr
    Let ic = index of (fake, c) in MORPH.vert_arr
    Add (ia, ib, ic) to CurMorph.connectivity
End for
For b1 = 1 to 4 do
    For b2 = 1 to 4 do
        For b3 = 1 to 4 do
            For b4 = 1 to 4 do
                If (b1, b2, b3, b4) are distinct
                      Let CurMorph.fakeB [1] = B.v[b1]
                      Let CurMorph.fakeB [2] = B.v[b2]
                      Let CurMorph.fakeB [3] = B.v[b3]
                      Let CurMorph.fakeB [4] = B.v[b4]
                      Let CurMorph.fakeA [b1] = A.v[1]
                      Let CurMorph.fakeA [b2] = A.v[2]
                      Let CurMorph.fakeA [b3] = A.v[3]
                      Let CurMorph.fakeA [b4] = A.v[4]
                      If (CurMorph.Quality() > BestMorphQuality)
                          BestMorph = CurMorph
                          BestMorphQuality =
                          CurMorph.Quality ()
                      End if
                End if
            End for
        End for
    End for
End for
Return (BestMorph)

Table III illustrates an example morph quality function, such as is used in CurMorph above. However, other quality functions may also be used to better fit a given user's application.

Table III

© 1998 Intel Corporation
Process Morph3d.Quality()
For I=1 to 4 do
    Let d[I]=Distance squared from Morph3d.realA (I) to Morph3d.fakeB (I)
End for
Let TB={B.triangle (1), B.triangle (2), B.Triangle (3), B.triangle (4)}
Let T_MappedA={}
For I=1 to 4 do
    Let tA=Morph3d.connectivity (I)
    Let tA_map1=Morph3d.fakeB [tA [1]]
    Let tA_map2=Morph3d.fakeB [tA [2]]
    Let tA_map3=Morph3d.fakeB [tA [3]]
    Let tA_map=indexed triangle (tB1, tB2, tB3)
    Add tA_map to T_MappedA
End for
If (TB !=T_MappedA)
    Return (-Infinity)
End if
Return (d[1]+d[2]+d[3]+d[4])*-1

Table IV illustrates an embodiment of a process for the 2-D case for modifying the previously described MORPH data structure embodiment to match the topology changes.

Table IV

© 1998 Intel Corporation
Process Modify 2-D Morph (ProgPgon A, ProgPgon B, MORPH2D CurMorph)
/* Initialize parameters specifying how to increase resolution of A */
Let v=new vertex to add to A, in order to increase A's resolution
Let pos=index in A.vertices (and CurMorph.realA) where to insert nv
/* Changes required to CurMorph.realA: */
CurMorph.realA.insert_at (pos, v)
/* Changes required to CurMorph.realB: none */
/* Changes required to CurMorph.fakeA: */
Let nvr=CurMorph.realA.size ()
Let old_nvr=nvr-1
Let posM1=1+((pos-2+nvr) MOD nvr)/* position before pos */
Let posP1=(pos MOD nvr)+1/* position after pos */
Let vrp1=CurMorph.realA [posP1]
Let vrm1=CurMorph.realA [posM1]
Let Ipos=index of (real, pos) in CurMorph.vert_arr/* position of vr in vert_arr */
Let IposM1=index of (real, posM1) in CurMorph.vert_arr
Let nf=(Ipos-IposM1-1+nvr) MOD nvr/* # fake verts on removed edge */
Let NT_before=0/* #fake verts mapped to new edge between vrm and v */
Let d_orig=distance (vrp1, vrm1)
Let dv_vrm1=distance (v, vrm1)
Let dv_vrp1=dist (v, vrp1)
Let d_new=dv_vrm1+dv_vrp1
Let r=dv_vrm1/d_new
For i=1 to nf do
    Let idx_fake=1+((Ipos-1+i) MOD nvr)/* Usually (Ipos+i) */
    Let (which_A, which_fake)=CurMorph.vert_arr [idx_fake]
    Let vf=CurMorph.fakeA [which_fake]
    Let d1=distance (vf, vrm1)
    Let ratio=d1/d_orig
    Let new_fake_d=d_new * ratio
    if (new fake_d<dv_vrm1)
        Let new_vf=point at distance new_fake_d from vrm1, towards v
        NT_before=NT_before+1
    else
        new_fake_d=new_fake_d-dv_vrm1
        Let new_vf=point at distance new_fake_d from v, towards vrp1
    end if
    CurMorph.fakeA [which_fake]=new_vf
End for
/* Changes required to CurMorph.fakeB: */
Let old_posM1=1+((pos-2+old_nvr) MOD old_nvr)/* position before pos */
Let fvr=CurMorph.fakeB [pos]
Let fvrm1=CurMorph.fakeB [old_posM1]
Let dtot=distance from fvrm1 to fvr on B
Let d=r * dtot
Let new_fake_vertex=traverse B from fvrm1 towards fvr, stopping at distance d CurMorph.fakeB.insert_at (pos, new_fake_vertex)
/* Changes required to CurMorph.vert_arr: */
For i=1 to CurMorph.vert_arr.size () do
   Let (whicharr, j)=CurMorph.vert_arr [i]
   if a (j>=pos) and (whicharr==real)
     CurMorph.vert_arr [j ]=(real, j+1)
   End if
End loop
CurMorph.vert_arr.insert_at (IposM1+NT_before, (real, pos))

Table V illustrates an embodiment of a process for the 3-D case for modifying the previously described MORPH data structure embodiment to match the topology changes.

Table V

© 1998 Intel Corporation
Process Modify 3-D Morph (ProgMesh A, ProgMesh B, MORPH3D CurMorph)
/* Initialize parameters specifying how to increase resolution of mesh A */
Let vts=index of the vertex to split in mesh A, to increase A's resolution
Let nv=new vertex to add to mesh A, in order to increase A's resolution
Let add_list={triangles to add to mesh A, in order to increase A's resolution}
Let del_list={triangles to remove from mesh A, when increasing A's resolution}
/* Changes required to CurMorph.realA: */
CurMorph.realA.addlast (nv)
/* Changes required to CurMorph.realB: none */
/* Changes required to CurMorph.fakeA: none */
/* Changes required to CurMorph.fakeB: */
Let v=CurMorph.fakeB [vts]
CurMorph.fakeB.addlast (v)
/* Changes required to CurMorph.vert_arr: */
CurMorph. vert_arr. addlast ((real, size(CurMorph.realA)))
/* Changes required to CurMorph.connectivity: */
Let n=del_list.size()
For i=1 to n do
   Let (a, b, c)=del_list [i]
   Let (d, e, f)=add_list [i]
   Let ia=index of (real, a) in CurMorph.vert_arr
   Let ib=index of (real, b) in CurMorph.vert_arr
   Let ic=index of (real, c) in CurMorph.vert_arr
   Let id=index of (real, d) in CurMorph.vert_arr
   Let ie=index of (real, e) in CurMorph.vert_arr
   Let if=index of (real, f) in CurMorph.vert_arr
   Let it=index of (ia, ib, ic) in CurMorph.connectivity
   CurMorph.connectivity [it]=(id, ie, if)
End for
For i=n+1 to add_list.size() do
   Let (d, e, f)=add list [i]
   Let id=index of (real, d) in CurMorph.vert_arr
   Let ie=index of (real, e) in CurMorph.vert_arr
   Let if=index of (real, f) in CurMorph.vert_arr
   Add (id, ie, if) to CurMorph.connectivity
End for Both of the modify processes shown may be used for the case of increasing model A's resolution. Similar processes may be used for the case of increasing model B's resolution.

Figure 6:
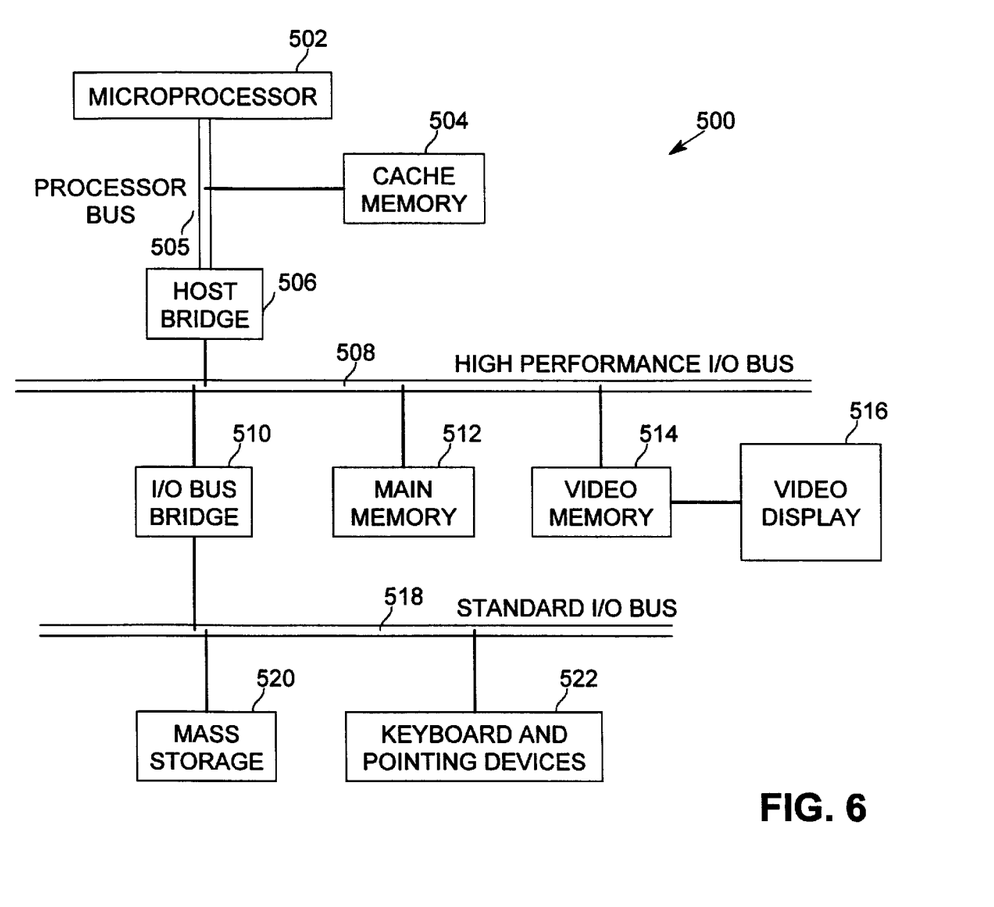
FIG. 6 is a diagram illustrating a sample computer system suitable to be programmed a method for progressively constructing morphs in accordance with embodiments of the present invention.

FIG. 6 illustrates a sample computer system suitable to be programmed with an embodiment of a method for the progressively constructing a morph in accordance with the present invention. Sample computer system 500 may be used to execute, for example, the processing described above for the embodiments described in connection with FIG. 5, for example. Sample computer system 500 is representative of computer systems based on the PENTIUM®, PENTIUM® Pro, and PENTIUM® II microprocessors available from Intel Corporation, although other computer systems (including personal computers (PCs) having other microprocessors) may also be used Sample computer system 500 includes microprocessor 502 and cache memory 504 coupled to each other through processor bus 505. Sample computer system 500 also includes high performance I/O bus 508 and standard I/O bus 518. Processor bus 505 and high performance I/O bus 508 are bridged by host bridge 506, whereas high performance I/O bus 508 and standard I/O bus 518 are bridged by I/O bus bridge 510. Coupled to high performance I/O bus 508 are main memory 512 and video memory 514. Coupled to video memory 514 is video display 516. Coupled to standard I/O bus 518 are mass storage 520, and keyboard and pointing devices 522.

These elements perform their conventional functions well known in the art. In particular, mass storage 520 may be used to provide permanent storage for the executable instructions for an embodiment of a method of progressively constructing a morph in accordance with the invention, whereas main memory 512 may be used to temporarily store the executable instructions of an embodiment of a method of progressively constructing a morph in accordance with the during execution by CPU 502.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of defining morphs between a first model having a first resolution and a second model having a second resolution comprising:
   (a) defining a first morph between the first model and the second model by automatically determining correspondence of vertices between the models;
   (b) increasing resolution of at least one of the models; and
   (c) defining a subsequent morph between the first model and the second model by automatically determining correspondence of vertices between the models.

2. The method of claim 1, further comprising reducing resolution of at least one of the first model and the second model before (a).

3. The method of claim 2, wherein a reduced resolution of the first model is a lowest resolution for the first model.

4. The method of claim 2, wherein a reduced resolution of the second model is a lowest resolution for the second model.

5. The method of claim 2, further comprising repeating (b) and (c) until the first model is at the first resolution.

6. The method of claim 2, further comprising repeating (b) and (c) until the second model is at the second resolution.

7. The method of claim 1, wherein each of the first and second models comprise a two dimensional progressive polygon model.

8. The method of claim 1, wherein each of the first and second models comprise a three dimensional progressive mesh model.

9. The method of claim 1, wherein (b) comprises increasing resolution by at least one vertex.

10. The method of claim 9, wherein increasing by at least one vertex comprises increasing resolution by more than one vertex.

11. An apparatus for defining morphs between a first model having a first resolution and a second model having a second resolution comprising:
a processing unit for executing programming instructions; and
a storage medium having stored therein a plurality of programming instructions to be executed by the processing unit, wherein when executed, the plurality of programming instructions define a first morph between the first model and the second model by automatically determining correspondence of vertices between the models; increase resolution of at least one of the models; and define a subsequent morph between the first model and the second model by automatically determining correspondence of vertices between the models.

12. The apparatus of claim 11, wherein the programming instructions further comprise instructions to reduce resolution of at least one of the first model and the second model before determining a first morph.

13. The apparatus of claim 12, wherein a reduced resolution of the first model is a lowest resolution for the first model.

14. The apparatus of claim 12, wherein a reduced resolution of the second model is a lowest resolution for the second model.

15. The apparatus of claim 12, wherein the programming instructions further comprise instructions to repeat increasing resolution and determining a subsequent morph until the first model is at the first resolution and the second model is at the second resolution.

16. The apparatus of claim 11, wherein each of the first and second models are two dimensional progressive polygon models.

17. The apparatus of claim 11, wherein each of the first and second models are three dimensional progressive mesh models.

18. The apparatus of claim 11, wherein the programming instructions to increase resolution comprise programming instructions to increase resolution by at least one vertex.

19. The apparatus of claim 18, wherein the programming instructions to increase resolution comprise programming instructions to increase resolution by more than one vertex.

20. A machine readable medium having stored therein a plurality of machine readable instructions executable by a processor, the machine readable instructions comprising instructions to define morphs between a first model having a first number of vertices and a second model having a second number of vertices by reducing the number of vertices of at least one of the first model and the second model, defining a first morph operation between the first model and the second model by automatically determining correspondence of vertices between the models; increasing the number of vertices of at least one of the models; and defining a subsequent morph operation between the first model and the second model by automatically determining correspondence of vertices between the models.

21. The machine readable medium of claim 20, wherein the machine readable instructions further comprise instructions to repeat increasing resolution and determining a subsequent morph until the first model is at the first number of vertices and the second model is at the second number of vertices.

22. The machine readable medium of claim 20, wherein the first model is a two dimensional progressive polygon model and the number of vertices of the first model after the reducing is three.

23. The machine readable medium of claim 20, wherein the second model is a two dimensional progressive polygon model and the number of vertices of the second model after the reducing is three.

24. The machine readable medium of claim 20, wherein the first model is a three dimensional progressive mesh model and the number of vertices of the first model after the reducing is four.

25. The machine readable medium of claim 20, wherein the second model is a three dimensional progressive mesh model and the number of vertices of the second model after the reducing is four.

26. The machine readable medium of claim 20, wherein the programming instructions to increase the number of vertices comprise programming instructions to increase the number of vertices by more than one vertex.

27. The method of claim 1, wherein increasing the resolution of at least one of the models comprises increasing the resolution automatically, without user intervention.

28. The apparatus of claim 11, wherein the instructions for increasing the resolution of at least one of the models comprises instructions for increasing the resolution automatically, without user intervention.

29. The machine readable medium of claim 20, wherein the instructions for increasing the resolution of at least one of the models comprises instructions for increasing the resolution automatically, without user intervention.

30. The method of claim 1, wherein defining the first morph and defining the subsequent morph comprise automatically defining the morphs without user interaction.

31. The apparatus of claim 11, wherein instructions for defining the first morph and defining the subsequent morph comprise instructions for automatically defining the morphs without user interaction.

32. The machine readable medium of claim 20, wherein instructions for defining the first morph and defining the subsequent morph comprise instructions for automatically defining the morphs without user interaction.

33. The method of claim 1, wherein the first model and the second model have a different number of vertices.

34. The machine readable medium of claim 20, wherein the first model and the second model have a different number of vertices.

* * * * *

UNITED STATES PATENT AND TRADEMARK OFFICE
CERTIFICATE OF CORRECTION

PATENT NO. : 6,362,833 B2
DATED : March 26, 2002
INVENTOR(S) : Trika

It is certified that error appears in the above-identified patent and that said Letters Patent is hereby corrected as shown below:

<u>Column 8,</u>
Line 47, delete "new fake_d", insert -- new_fake_d --.

<u>Column 9,</u>
Line 56, delete "add list [i]", insert -- add_list [i] --.

Signed and Sealed this

Twenty-sixth Day of November, 2002

Attest:

Attesting Officer

JAMES E. ROGAN
*Director of the United States Patent and Trademark Office*